May 12, 1931.　　　　E. J. GRANT　　　　1,804,764
APPARATUS FOR AND METHOD OF CUTTING MATERIAL
Filed Dec. 1, 1928　　3 Sheets-Sheet 2
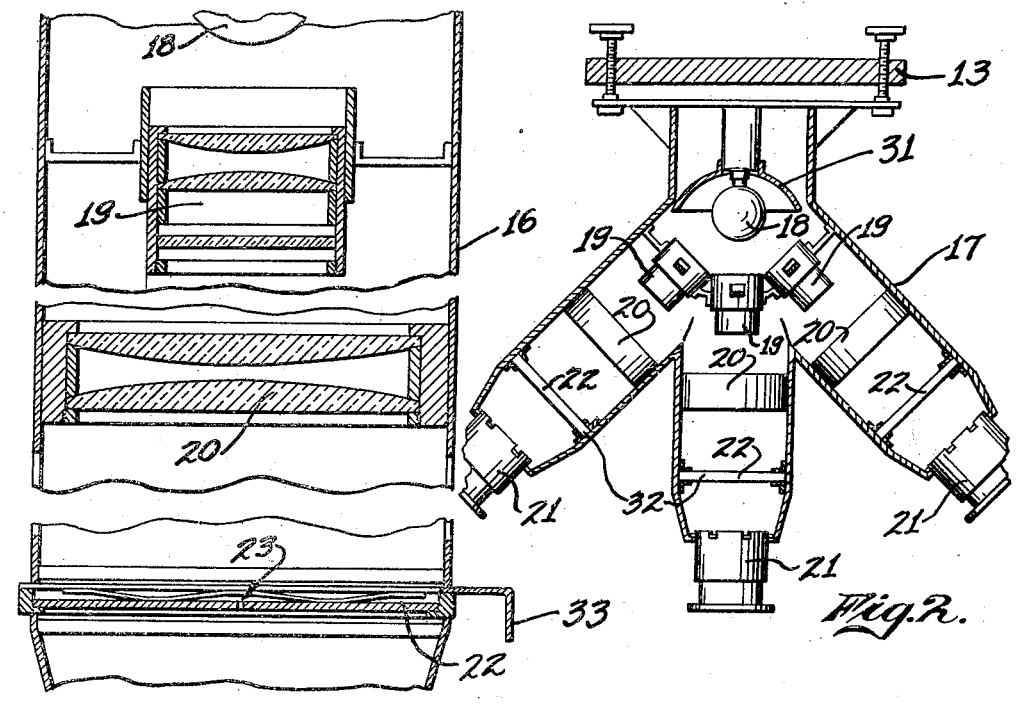
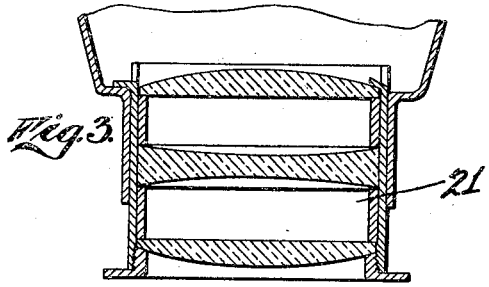
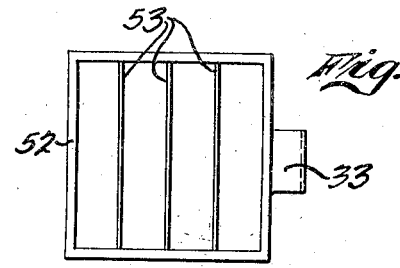
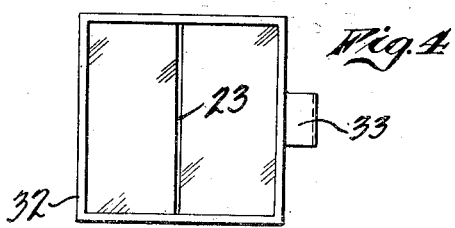
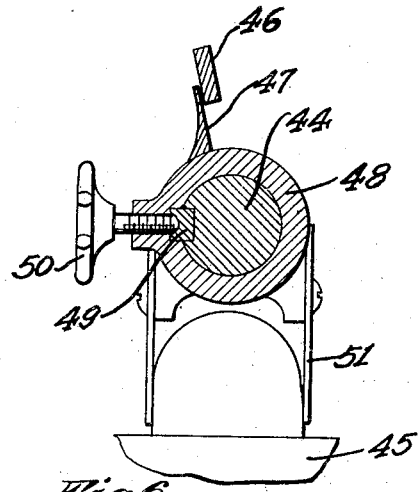
Inventor
Edwin J. Grant.
By Lyon & Lyon
Attorneys May 12, 1931. E. J. GRANT 1,804,764
APPARATUS FOR AND METHOD OF CUTTING MATERIAL
Filed Dec. 1, 1928 3 Sheets-Sheet 3

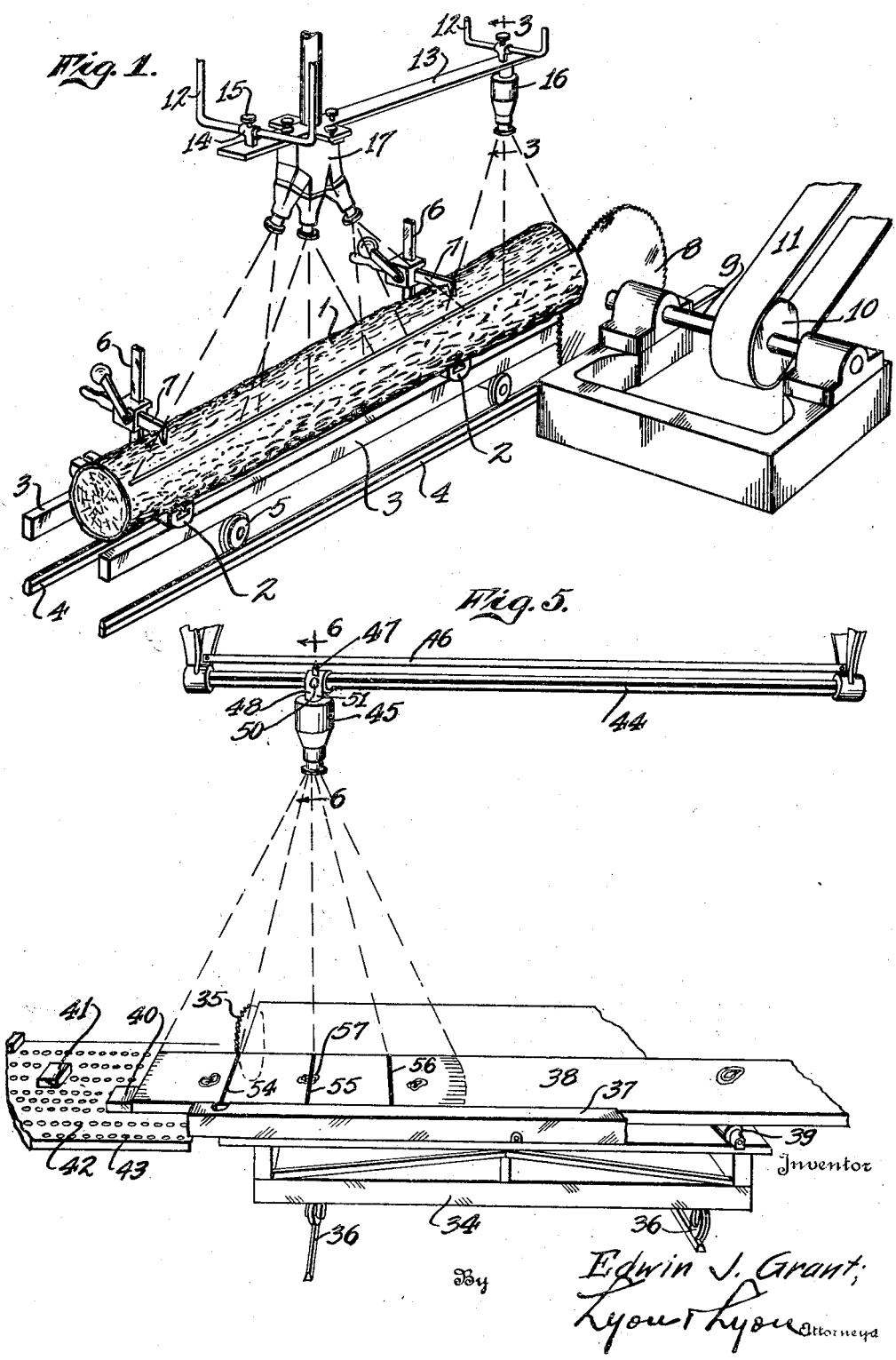

Inventor,
Edwin J. Grant,
By Lyon & Lyon
Attorneys

Patented May 12, 1931

1,804,764

UNITED STATES PATENT OFFICE

EDWIN J. GRANT, OF LOS ANGELES, CALIFORNIA

APPARATUS FOR AND METHOD OF CUTTING MATERIAL

Application filed December 1, 1928. Serial No. 323,080.

This invention relates to a method of cutting materials whereby a cutting means and the material to be cut are correlated by means of a light boundary projected and focused upon said material. More specifically the method described and embodied herein embraces the steps of selecting a point or plurality of points through which a cut is to be made by means of a definitely shaped beam of light or light boundary coordinated with a cutting means and a guiding means, and projected and focused upon the material to be cut, and then bringing by means of the guiding means the material to be cut and the cutting means into working relation so as to cut through the selected point or plurality of points.

This invention also relates to an apparatus adapted to carry out the method of the invention and its objects. Generally, the apparatus comprises a cutting means, a guiding means for bringing said cutting means and material to be cut in operable relation, and means for projecting and focusing a definately shaped beam of light or recognizable light boundary at a point or plurality of points bearing a predetermined relation to said cutting means, so as to correlate said cutting means and the material to be cut.

An object of this invention is to provide a method of correlating a cutting means and material to be cut, so as to identify and select a predetermined point or points on the material to be cut, through which a cut is to be made.

Another object is to provide a method whereby sawing and cutting operations may be facilitated and the formation of waste material materially reduced.

An object of this invention is to provide means for correlating cutting means and guiding means to permit a cut to be made through a selected point or points on material to be cut.

Although the method and apparatus described herein and embraced by this invention may be employed in various ways and for various purposes, it will be described, for purposes of illustration, as applied to various sawing operations.

It will be understood that instead of sawing, the apparatus may be caused to carry out other operations, and various changes and modifications may be made without departing from the spirit of the invention described and herein claimed.

In order to illustrate one of the uses and purposes of this invention, reference may be made to a sawmill in which boards or slabs are to be cut from logs. The logs are generally placed on a traveling frame or head block, and then moved longitudinally against a large circular or band saw, means being provided for moving and positioning the log transversely prior to cutting. It is difficult to estimate the position of the saw with respect to the surface of the log, and the operator often takes the initial cut in a plane not parallel to the surface of the log, that is, a wedge shape board or slab is cut and a triangular surface is exposed on the log. Furthermore, the log often misses the saw entirely, thereby causing an appreciable loss of time. If the cut is too deep, quantities of lumber are wasted.

Briefly stated, the method of this invention includes the step of correlating the saw and the material to be cut by means of a definitely shaped beam of recognizable light or light boundaries projected and focused upon the material to be cut, so as to permit the operator to select desired points through which a cut is then automatically made.

The apparatus for use in the above example of slabbing a log comprises means for projecting and focusing a definitely shaped beam of light upon the log at a point or points bearing a fixed relation to the saw, so as to more quickly and efficiently coordinate the material to be cut with said saw to give the least possible quantity of waste lumber, and to produce the best grades of lumber from the log.

In describing the invention and particularly the apparatus embraced thereby, reference will be had to the attached drawings in which, Figure 1 is a perspective view of a cutting apparatus constructed in accordance with the provisions of this invention and adapted to slab logs, one of which is indicated in position upon a carriage. Certain portions of the mechanism for operating the carriage and for moving the log on the carriage have been omitted, as it is well understood in the art.

Figure 2 is an enlarged section taken along a vertical plane through the tri-beam projector shown in Figure 1.

Figure 3 is an enlarged vertical section, partly broken away, taken along a plane 3—3 passing through a projector shown in Figure 1.

Figure 4 is a reduced plan view of an aperture slide shown in Figure 3.

Figure 5 is a perspective view of another form of cutting apparatus embodying the invention, said apparatus being partly broken away, illustrating a cutting-off saw.

Figure 6 is an enlarged vertical section of a portion of the apparatus shown in Figure 5, taken on the line indicated by 6—6.

Figure 7 is an enlarged plan view of a slide used in the projector shown in Figures 5 and 6.

Figure 8:
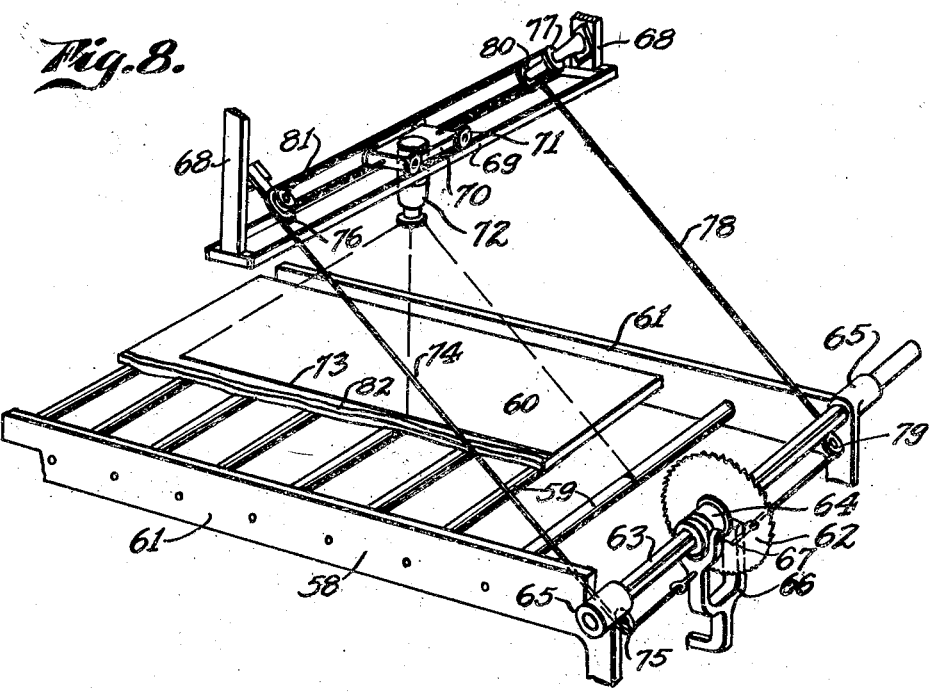
Figure 8 is a perspective view of an edging machine embodying this invention.

In the sliding apparatus shown in Figure 1, the log 1 may be mounted upon a traveling carriage consisting of head blocks 2 connected by means of a frame 3, said frame being movably mounted so as to run upon longitudinal guide rails 4, as by means of wheels 5.

The head blocks 2 bear knees 6 which are movable transversely of the carriage and which may be adjustably positioned thereon. Means for moving the knees 6 are not shown, as such means are well known in the art. The knees generally carry dogs 7 which are adjustably mounted upon the knees 6, and which are used to hold the log 1 in position upon the traveling carriage or head blocks 2.

The cutting member adapted to operate upon the log 1 may consist of a large circular saw 8 mounted on a shaft 9 passing through suitable bearings in a suitable framework or bed, the shaft 9 being driven in any suitable manner, as, for example, by means of a pulley 10 mounted thereon and a belt 11 driven from a source of power, not shown. The saw 8 is so positioned as to rotate in a plane parallel to the tracks 4 and adapted to barely miss the outer ends of the head blocks 2.

Suspended above the traveling carriage and rails in any suitable manner, as, for example, by means of the brackets 12 hung from a ceiling or other supporting structure, there may be a projector support 13; the projector support 13 may be adjustable transversely to the path of the material to be cut, namely, the log 1, by means of eyes 14 connected to the projector support 13, said eyes 14 being slidably mounted on the brackets 12 and provided with means 15 for adjustably locking the eyes in position upon the brackets 12.

One or more projectors 16 may be suspended from the support 13. As shown in Figure 1, a single projector 16 may be used and a tri-beam projector 17 may also be employed. The projectors 16 and 17 may be so mounted with respect to the carriage 3 as to have the vertical axes passed through the projectors 16 and 17 at ninety degrees to the plane of said carriage or guide rails 4, or said projectors 16 and 17 may be slightly inclined thereto.

The projectors 16 and 17 may project and focus points, lines or other definitely shaped beams of light or recognizable light boundaries upon the log 1, the projected beams of light from the projectors 16 and 17 being in alignment upon the log with the cutting planes of the saw 8 or other cutting means.

Details of construction of the single beam projector 16 are shown in Figure 3. A suitable light source is indicated at 18, a condensing lens system at 19 and 20, a projecting lens system at 21, and an aperture slide at 22. The object of the condensing lens system 19 and 20 is to concentrate the light from the source 18 so that it will fall in a beam along the aperture 23 in the slide 22, and thereby allow the projector to project a sharp focused line of light. It will be understood that instead of using a continuous line of light, similar projecting means may be employed for projecting points of light. The light source 18 preferably consists of a single luminous filament parallel to the aperture 23 and the slide 22, said filament also preferably being in a plane passing through said aperture, thereby assisting in concentrating the light to form an intense beam.

Figure 9:
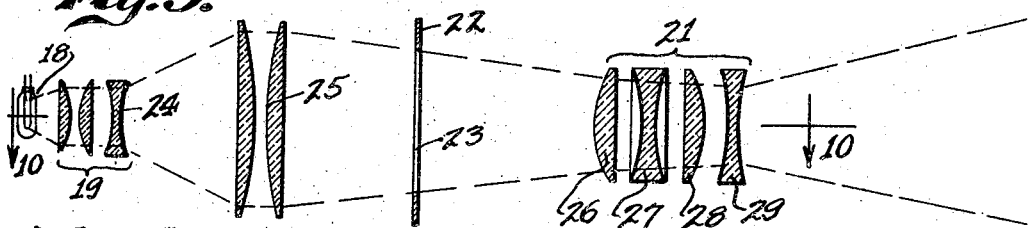
Figure 9 is a diagrammatic representation of one form of lens system that may be employed.
Figure 10:
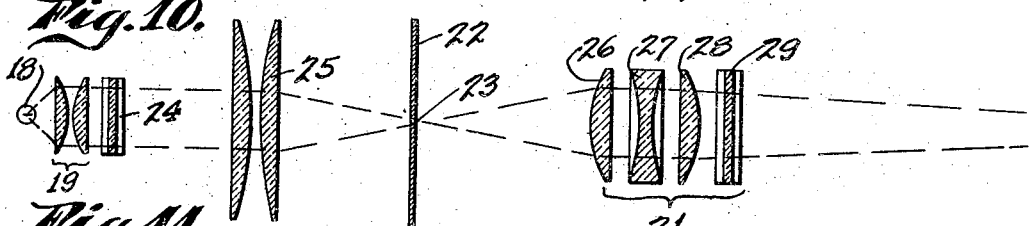
Figure 10 is a diagrammatic horizontal section taken through the lens system shown in Figure 9 along a plane indicated at 10—10.

A diagrammatic representation of the projector 16 illustrated in Figure 3 is shown in Figures 9 and 10. The condenser system 19 comprises a pair of plano-convex spherical lenses followed by a bi-concave cylindrical lens 24. The light then passes through a pair of plano-convex spherical lenses 25 which concentrate the light into a narrow beam adapted to pass through the aperture 23 in the slide 22. The light so restricted is then passed through the projecting and focusing lens system 21, which may comprise a plano-convex spherical lens 26, a bi-concave spherical lens 27, a plano-convex spherical lens 28 and a bi-concave cylindrical lens 29.

Figure 11:
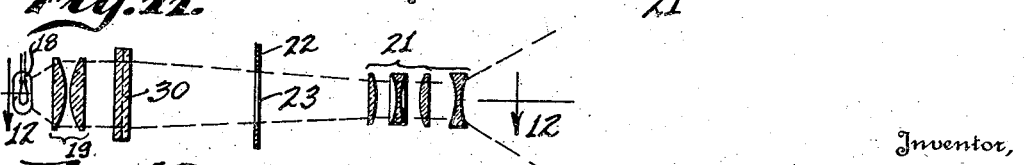
Figure 11 is a diagrammatic representation of another and modified form of lens system which may be employed in the projectors shown in the preceding views.
Figure 12:
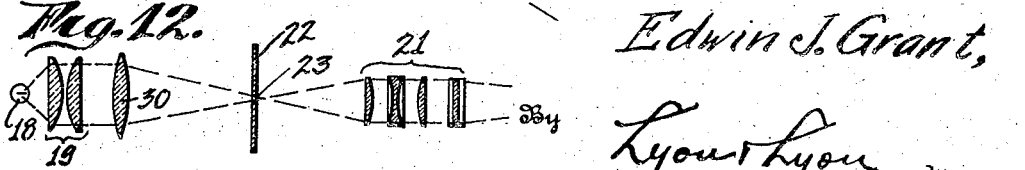
Figure 12 is a diagrammatic horizontal section taken along the line 12—12 in Figure 11.

Instead of using the lens system hereinabove described and illustrated in Figures 9 and 10, a lens system shown in Figures 11 and 12 may be used. In this modified form, the light from the source 18 passes through a condensing system comprising a pair of plano-convex spherical lenses and then through a bi-convex cylindrical lens 30. The light concentrated by the last-named lens, after having been restricted by aperture 23 in a slide 22, passes through the projecting and focusing lens system 21, similar in all respects to that shown in Figures 9 and 10. The use of the bi-concave cylindrical lens in the projecting system in each of the series is optional, as depending upon the length of the line desired to be projected.

The tri-beam projector 17 is illustrated in more detail in Figure 2. Light from a source 18, preferably reflected from a reflector 31, is distributed and passes through three separate sets of condensing lens systems, indicated at 19, then through the secondary condenser systems 20, through the aperture plates 22, and then through the projection lens systems 21. It will be understood that any desired arrangement of condenser and projection lens system may be used in either the tri-beam projector 17, or in the single beam projector 16.

Figure 4 illustrates one form of aperture plate 22. The aperture plate may be suitably mounted in a frame 32 provided with a tongue 33, which may extend exteriorly of the housing of the projection means, so as to assist in adjustably positioning the aperture plate within the projector. It will be understood that a suitable slot is made in the housing of the projector, so as to enable the introduction of the aperture plate 22 and its frame 32.

In operating the machine shown in Figure 1, the projectors 16 and 17 are so adjusted as to project a definitely shaped focused beam of light or light boundary, preferably, in a plane coincidental with and in an extension of the plane passing through the cutting member or saw 8. When a log or other material to be cut is mounted upon the traveling carriage 3 and upon the head blocks 2 by means of the dogs 7 cooperating with the knees 6, the operator may then visually determine by the position of the projected light boundaries, definitely shaped beams of light, points or lines projected by the projectors 16 and 17 upon the log 1, the precise location at which a cut will be made. In other words, he is enabled to so adjust the knees 6 and the dogs 7, and thereby so manipulate the log 1, as to select a spot upon said log through which a cut is to be made. After such selection has been made, the carriage 3, together with the log 1 carried thereby, is moved into cutting relation with the saw 8, and the desired cut is made. In this manner the precise depth of cut and location of points through which a cut is to be made, is predetermined by means of light boundaries projected upon the material to be cut, said light boundaries being coordinated with the cutting means.

In Figure 5 an apparatus is shown adapted to cut desired lengths from a board or other piece of material. The apparatus comprises a traveling carriage 34 adapted to move in a plane parallel to the plane of a cutting member, such as the saw 35, upon guide rails or other guides 36. The traveling carriage 34 is preferably provided with a transverse guide 37, which may either extend along the rear edge of the carriage 34 and present a face to the material being cut 38 at ninety degrees to the plane of the cutting member 35, or at any other predetermined angle. Generally, a roller 39 is mounted upon the traveling carriage 34, so as to facilitate the placement of material to be cut upon the carriage. Exteriorly of the traveling carriage 34 stop means may be provided, said stop means having a definite relation with the plane of the cutting member 35 and being so positioned as to cooperate with the material to be cut 38. The stop means, such, as for example, the blocks 40 and 41, may be adjustably positioned upon a bed plate 42 provided with a plurality of keyways or apertures 43, said apertures 43 being in spaced relation to each other and to the plane of the cutting member 35. The blocks 40 and 41 may be provided with pegs or lugs adapted to be slidably received in said apertures, thereby enabling the positioning of the blocks 40 and 41 at required points on the bed plate 42.

Adjustably positioned above the carriage and guide means 34, as upon a spline shaft 44 rigidly mounted above the carriage, there may be a projector 45. A suitable scale, rule or other index 46 may also be rigidly mounted immediately above the spline shaft 44, said scale or index 46 being adapted to cooperate with a pointer 47 carried by the projector 45 or rigidly connected thereto. As shown in more detail in Figure 6, the projector 45 may be suspended from a supporting sleeve 48 mounted upon the spline shaft 44 and provided with a key 49, by means of which the projector and sleeve or collar 48 may be locked in position, said locking being facilitated by means of a hand wheel or thumb screw 50 adapted to bear upon the key 49. The sleeve 48 may be provided with a pointer 47 which, as hereinabove described, cooperates with the scale or other index 46. The projector 45 may be rigidly connected to the sleeve or collar 48 as by means of lugs or straps 51.

The projector 45 may be provided with a slide, illustrated in Figure 7, and comprises a frame 52, having a plurality of wires or other opaque materials 53 mounted therein across the aperture made by said frame 52. For example, the frame 52 may bear a translucent or transparent material, such as glass, upon which lines or other opaque marks have been made. The projector 45 does not contain the condensing lens system or systems 19 and 20 hereinabove described for projectors 16 and 17, but instead, an ordinary condensing projector lens system consisting of 20, only, is employed, so as to equally illuminate the entire frame 52.

The apparatus shown in Figure 5 is used in cutting boards or other long pieces of material into shorter lengths or pieces. For example, pieces of certain predetermined lengths are used in the manufacture of boxes, and for this purpose stops 40 and 41 beyond the cutting plane of the saw 35 are so correlated with respect to the plane of the cutting members 35 as to give finished pieces of the preferred lengths. In view of the fact that a cut generally should not be made through a knot or other imperfection in a board, for the reason that it would give a knot on the nailing edge of part of the box, the operator estimates the distance from the cutting plane to the knot and then selects that one of the preferred lengths which he believes will cut to the best advantage and miss the knot, or he may cut out a short length from the cutting end of the board so as to miss the knot on the next cut. Very often his estimate is wrong, and after positioning the board against a stop, he realizes that the cutting plane will pass through the knot and therefore has to shift the board to another stop. This lost motion is eliminated by my invention, as embodied in Figure 5, this apparatus operating as follows:

Projector 45 having a slide of the character shown in Figure 7, projects recognizable light boundaries caused by the interception of light by wires 53 at predetermined distances from and in relation to the cutting plane of member 35. These light boundaries will assume the form of dark, unilluminated lines parallel to the cutting plane and in spaced relation thereto when projected upon the board 38. Preferably the light boundaries 54, 55 and 56 indicate the position of the cutting plane and of the location or points through which succeeding cuts will be made for a preferred length. If, for example, the length indicated by stop 40 is preferred, that is, pieces of this length are to be made in preference to pieces of a length indicated by stop 41 and the board is in the position shown in Figure 5, the operator will see that the next cut if of the preferred length using stop 40, will pass through the knot 57 by reason of the light boundary cutting said knot. At the completion of the cut along plane 54, the carriage 34 returns automatically and the board 38 is then shifted transversely of the cutting plane, so as to abut stop 41, thereby enabling the cutting plane made by the saw 35 to miss the knot 57. The projected light boundaries 54, 55 and 56 are, therefore, correlated with stops 40 and 41 and with the cutting member 35 and coordinate the material to be cut with the cutting member, so that cuts are made at selected points on the material. Furthermore, the light boundaries 54, 55 and 56 are coordinated with the guiding means 37, inasmuch as they indicate the precise angle of the cutting plane with respect to said guide.

In Figure 8 the application of this invention to an edging machine is shown. The machine comprises a bed or frame 58 having a plurality of idler rollers 59 rotatably mounted thereon, so as to form a bed adapted to receive material to be cut, for example, the slab 60. A vertical guide 61 may be provided on one or both sides of the bed made by the rollers 59, so as to guide the slab 60 at a predetermined angle into the sawing means 62. A weighted driven roller is often positioned above the rollers 59 and adjustably spaced thereupon, so as to move the material to be cut (such as the slab 60) toward the cutting members. The weighted roller is not shown, as means for automatically feeding boards or slabs through machines of similar nature are well known in the art.

The cutting means may comprise one or more saws 62 mounted upon a keyed shaft 63, the saws 62 being movable longitudinally upon said shaft 63 without interrupting its rotation. The saw 62 may be rotatably mounted upon the shaft by means of a key carried in the hub 64 of the saw 62. The shaft 63 may be mounted in suitable bearings 65, carried by the frame 58 and driven by any suitable means. Transverse motion of the saw 62 may be imparted by means of a yoke 66 provided with pins 67 slidably resting in grooves made in the hub 64 of the saw 62, yoke 66 being operated by suitable means, not shown, from the front end of the apparatus. Other means for moving shafts longitudinally upon keyed shafts are known in the art, for example, instead of a yoke contacting with the hub, a yoke contacting with the blade of the saw may be employed.

Suspended above the machine, and preferably near the feed end thereof, is a stable framework 68 including tracks or other guides 69, said tracks or guides 69 being positioned in a plane parallel to the plane of rollers 59 and extending transversely to the cutting plane of the saw 62. A movable support 70 provided with wheels 71 adapted to run on or engage with guides 69 carries a projector 72 adapted to project and focus a definitely shaped beam of light, such as the line 73, upon the material to be cut and in a plane passing through the cutting plane of the saw 62.

Motion of the saw means 62 transversely of the machine may be translated into a synchronous motion of the projector 72 by various means, such as, for example, wires or other lines cooperating with means for moving the saw 62.

For example, a cable, rope or flexible wire 74 may be attached at one end to the yoke 66, then passed over a pulley 75 attached to the frame 58, then over a pulley 76 mounted upon the framework 68, then over a pulley 77 on the opposite end of the framework 68, and then attached to the traveling carriage 70, which supports the projector 72. Once the projected light boundary 73 has been correlated with the cutting plane of saw means 62, it will follow the saw transversely of the bed, that is, if the saw is moved to the right, the projector and indicating beam of light are also moved to the right. A second wire or cable 78 is preferably attached to the opposite side of yoke 66 and carriage 70, as by passing over pulleys 79, 80 and 81, respectively.

In operation, boards such as 60, having an irregularly shaped edge 82 which it is desired to remove, are placed upon rollers 59. The cutting means 62 and projector 72 move transversely until the beam of definitely shaped light, such as the line 73, is projected upon the point or points through which it is desired to make a cut and the board then fed to the sawing means 62, either automatically or manually. Inasmuch as the projector means 72 are synchronized and coordinated with the sawing means 62 and with the guide 61, the operator relies entirely upon the location of the beam 73 in running the machine and need not estimate the plane or points through which the cut will be made.

The method and apparatus hereinabove described may be adapted and used not only for sawing lumber or carrying on the operations specifically described hereinabove, but may also be applied to numerous other industries in which it is desired to cut materials. The invention is not to be limited, therefore, to the specific construction, arrangement of elements or sequence of steps hereinabove described, but includes all such modifications and changes as come within the scope of the following claims.

I claim:

1. A cutting apparatus comprising a cutting member operating in a fixed plane, guide means adapted to support and guide material to be cut from an exterior position into said cutting member, stop means adjustable toward and from the plane of said cutting member and adapted to cooperate with material to be cut while on said guide means, and means for projecting a plurality of lines of light upon material upon said guide means parallel to said cutting plane, while said material is in said exterior position, said lines of light projected by said means providing intangible lines which may be followed by the cutting means in any definite desired relation or position determined by the stop means.

2. A cutting apparatus comprising a cutting member operating in a fixed plane, guide means adapted to support and guide material to be cut from an exterior position into the plane of said cutting member, stop means adjustable toward and from the plane of said cutting member and adapted to cooperate with material to be cut while on said guide means, and means for projecting and focusing a plurality of lines of light upon material upon said guide means parallel to said cutting plane while said material is in cooperation with said stop means, said lines of light projected by said means providing intangible lines designating the lines which would be followed by the cutting means, in advance of bringing said material into cooperation with said stop means.

3. A cutting apparatus comprising a cutting member operating in a fixed plane, guide means adapted to support and guide material to be cut from an exterior position into said cutting member, stop means adjustable toward and from the plane of said cutting member and adapted to cooperate with material to be cut while on said guide means, and means for projecting a line of light upon material upon said guide means spaced from but parallel to said cutting plane, while said material is in said exterior position, said line of light projected by said means providing an intangible line which may be followed by the cutting means in any definite desired relation or position determined by the stop means.

4. A cutting apparatus comprising a cutting member operating in a fixed plane, guide means adapted to support and guide material to be cut from an exterior position into the plane of said cutting member, stop means adjustable toward and from the plane of said cutting member and adapted to cooperate with material to be cut while on said guide means, and means for projecting and focusing a line of light upon material upon said guide means spaced from but parallel to said cutting plane while said material is in cooperation with said stop means, said line of light projected by said means providing an intangible line designating the line which would be followed by the cutting means, in advance of bringing said material into cooperation with said stop means.

Signed at Los Angeles, California this 24th day of November, 1928.

EDWIN J. GRANT.